(12) United States Patent
Srinivasan

(10) Patent No.: US 8,434,090 B2
(45) Date of Patent: Apr. 30, 2013

(54) OPTIMALLY MANAGING COMPUTING IMAGES FOR DEPLOYMENT

(75) Inventor: Kattiganehalli Y. Srinivasan, Princeton Junction, NJ (US)

(73) Assignee: Novell, Inc., Provo, UT (US)

(*) Notice: Subject to any disclaimer, the term of this patent is extended or adjusted under 35 U.S.C. 154(b) by 896 days.

(21) Appl. No.: 12/417,206

(22) Filed: Apr. 2, 2009

(65) Prior Publication Data

US 2010/0257536 A1    Oct. 7, 2010

(51) Int. Cl.
*G06F 9/455* (2006.01)
*G06F 9/46* (2006.01)

(52) U.S. Cl.
USPC .......................................................... 718/105

(58) Field of Classification Search .................. None
See application file for complete search history.

(56) References Cited

U.S. PATENT DOCUMENTS

| | | | | |
|---|---|---|---|---|
| 5,842,011 | A * | 11/1998 | Basu | 713/2 |
| 6,922,831 | B1 * | 7/2005 | Kroening et al. | 717/172 |
| 7,356,679 | B1 | 4/2008 | Le et al. | |
| 2002/0073413 | A1 * | 6/2002 | Goodman | 717/172 |
| 2005/0289533 | A1 * | 12/2005 | Wang et al. | 717/168 |
| 2006/0174238 | A1 * | 8/2006 | Henseler et al. | 717/168 |
| 2009/0083404 | A1 | 3/2009 | Lenzmeier et al. | |

OTHER PUBLICATIONS http://www.smartdeploy.com/Products/VMexpress/vmexpressdatasheet.pdf Prowess VM Express "Highly Efficient Virtual Machine Distribution" © 2008 Prowess Solutions; 2 Pages.
http://vee08.cs.tcd.ie/slides/p49-talk.pdf; IBM Research, Hawthorne, NY; "Opening Black Boxes: Using Semantic Information to Combat Virtual Machine Image Sprawl".
Darrell Reimer, Arun Thomas, Glenn Ammons, Todd Mummert, Bowen Alpern, Vasanth Bala; Mar. 6, 2008; 28 Pages.

* cited by examiner

*Primary Examiner* — Corey S Faherty
(74) *Attorney, Agent, or Firm* — King & Schickli, PLLC

(57) ABSTRACT

Methods and apparatus involve "just-in-time" image creation services to address storage management issues faced by data centers. Representatively, a computing policy defines what images are required in software stacks according to intended workloads of computing devices during use and an order of assembly for each software stack is established. Upon a trigger event to instantiate an operating workload of any computing device, a workload image is configured for deployment to the hardware platform of the computing device, including assembling the stack in the order of assembly from stored virgin images of an operating system and any relevant applications. A delta of workload information is calculated when an operating workload for the computing device is to be brought down. Upon a trigger event to later re-instantiate the operating workload, another workload image is configured for deployment including combining the delta with the software stack, again, configured in the order of assembly.

8 Claims, 4 Drawing Sheets

OPTIMALLY MANAGING COMPUTING IMAGES FOR DEPLOYMENT

FIELD OF THE INVENTION

Generally, the present invention relates to computing devices and environments involving computing images. Particularly, although not exclusively, it relates to managing pluralities of images for deployment to computing devices, including "just-in-time" image creation services to address storage management issues faced by modern data centers. Other features contemplate computing arrangements, policies, data centers, and computer program products, to name a few.

BACKGROUND OF THE INVENTION

In a traditional data center, "software stacks" that define the workloads being hosted are bound to the physical machines hosting the workload. Just as diversity exists in such workloads, diversity also exists in the configuration of the machines, such as in their operating systems, drivers, storage interfaces, file systems, applications, etc. Given the tendency of enterprises to standardize on the operating environments of these machines (Linux, Windows, etc), correlation from one configuration to another does not transfer well when machines have vastly different configurations. When correlation does exist, on the other hand, significant portions of software stacks can be found replicated across the data center.

For instance, consider a data center that hosts a web farm of a thousand or more web servers, such as might be found in a "cloud" computing context. In turn, consider a common Linux based application stack—the so called LAMP (Linux, Apache, MySQL, PHP) stack—on many of the servers. Even if the workloads of the machines are different, each web server with LAMP stack executes the same identical software. In turn, multiple copies of the LAMP stack exist in the data center which leads to storage having identical stacks. This wastes capacity. Furthermore, if any of the software needs to be patched, every instance of the software stack needs to be patched which adds complexity, In the further situation of other servers not having a LAMP stack, situations remain where a significant portion of the software stack may be nonetheless identical across the workloads. For instance, completely separate workloads may still have commonality in a Linux-based architecture with Linux being a common operating system cross all workloads being hosted. Ultimately, managing and maintaining these software stacks individually, e.g., applying all the relevant patches, contributes significantly to the operational complexity of managing the data center. With the advent of virtual computing, the problem is only exacerbated since many virtual machines can be now guessed on a single hardware platform, including each with its own operating system, drivers, interfaces, applications, etc., which all may be vastly different or identical to one another.

Accordingly, a need exists in the art of computing for less administrative and storage costs. The need further contemplates a system that can provide commonality to ease coordination and management activities. Even more, the need should extend to virtual environments, each with many domains per a single hardware platform. Any improvements along such lines should further contemplate good engineering practices, such as ease of implementation, unobtrusiveness, stability, etc.

SUMMARY OF THE INVENTION

The foregoing and other problems become solved by applying the principles and teachings associated with the hereinafter-described optimal management of computing images. Broadly, methods and apparatus involve "just-in-time" image creation services to address storage management issues faced by data centers. It balances the overhead associated with storage capacities and requirements for computing devices with the speeds by which images can be deployed thereto. The proposed framework can also streamline patch management in that patches can be applied and maintained as workload specific image deltas.

In one embodiment, a computing policy defines what images are required in software stacks according to intended workloads of computing devices during use. Further, a "recipe" or order of assembly for each software stack is established. (Such are also tagged with unique identifiers.) Upon a trigger event to instantiate an operating workload of any computing device, a workload image is configured for deployment to the hardware platform of the computing device, including assembling the stack in the order of assembly from stored virgin images of an operating system and any relevant applications. A delta of workload information is calculated when an operating workload for the computing device is to be brought down or disassembled. Upon a trigger event to later re-instantiate the operating workload, another workload image is configured for deployment including combining the delta with the software stack, again, configured in the order of assembly. The unique identifier is examined during the re-instantiation, for example, to ensure consistent stack deployment.

Ultimately, as LAMP stacks are often repeatedly deployed from data centers, no longer do duplicitous servers need to individually retain their own version of the LAMP stack. Instead, each of the LAMP images, i.e., Linux, Apache, MySql, Perl/PHP/Python, can be stored one each as virgin images on a disk and assembled only on an as-needed basis. In combination with any relevant workload information, such as deltas of information between prior instantiation or disassembly actions, a complete workload image can be created in real-time for deployment to any computing device. In this way, only a single LAMP stack need be stored, not multiple such LAMP stacks. Also, the magnitude in storage of any deltas of workload information is trivial in comparison to bulk storage of duplicitous LAMP stacks. As skilled artisans can envision, dozens, hundreds or even thousands of LAMP stacks can be associated with computing devices and virtual machines deployed from a single data center, especially in "cloud" computing environments. Now, however, only a single golden image of each L-A-M-P is required for storage. This minimizes the overhead costs associated with storage capacities and requirements for computing devices in comparison to the prior art.

In accomplishing the foregoing, at least first and second computing devices have a hardware platform with a processor, memory and available storage. A computing policy with the storage defines what images are required for software stacks of many computing devices according to intended workloads of the computing devices during use and include a given software stack for the second computing device and an order of assembly therefor. A plurality of virgin images of an operating system and any applications for the many computing devices are stored for retrieval so the first computing device can assemble the given software stack in the order of assembly for deployment to the hardware platform of the second computing device. A separate or same storage retains deltas of workload information for the many computing devices for times when an operating workload for any of the many computing devices is brought down. An image creation work area in the available storage is further configured for assembling the deltas together with the operating systems and the any applications for the many computing devices. Any of the computing devices can be servers in a data center that communicate with a deployment engine common to other data centers.

In still other embodiments, policies may further define when computing devices are instantiated, when they are deployed with images, when they are taken down, what software exists in their stack, etc. In combination with monitoring or other log events of various computing devices, the policies can be enforced. They can reside together or separate with devices, such as the deployment engine, the data center, the image creation server, or elsewhere.

Executable instructions loaded on one or more computing devices for undertaking the foregoing are also contemplated as are computer program products available as a download or on a computer readable medium. The computer program products are also available for installation on a network appliance or an individual computing device.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical arrangement, software and/or other changes may be made without departing from the scope of the present invention. In accordance with the present invention, methods and apparatus are hereinafter described for managing computing images.

Figure 1A:
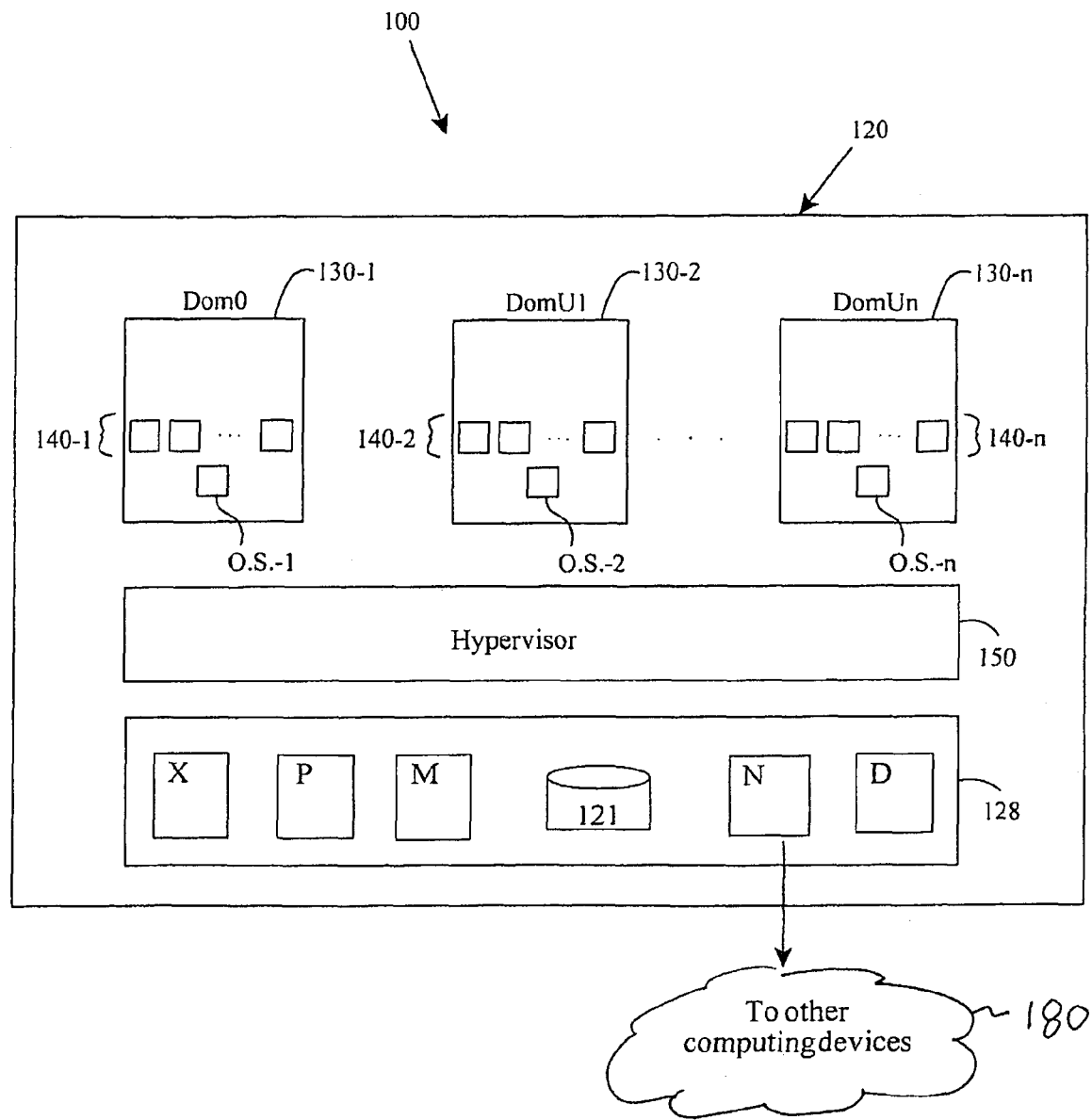
FIGS. 1A and 1B are diagrammatic views in accordance with the present invention of basic computing devices.

With reference to FIG. 1A, a computing system environment 100 includes a computing device 120. Representatively, the device is a general or special purpose computer, a phone, a PDA, a server, a laptop, etc., having a hardware platform 128. The hardware platform includes physical I/O and platform devices, memory (M), access to remote or local storage drives 121, processor (P), such as a CPU(s), USB or other interfaces (X), drivers (D), etc. In turn, the hardware platform hosts one or more virtual machines in the form of domains 130-1 (domain 0, or management domain), 130-2 (domain U1), . . . 130-n (domain Un), each having its own guest operating system (O.S.) (e.g., Linux, Windows, Netware, Unix, etc.), applications 140-1, 140-2, . . . 140-n, file systems, etc.

An intervening Xen or other hypervisor layer 150, also known as a "virtual machine monitor," or virtualization manager, serves as a virtual interface to the hardware and virtualizes the hardware. It is also the lowest and most privileged layer and performs scheduling control between the virtual machines as they task the resources of the hardware platform, e.g., memory, processor, storage, network (N) (by way of network interface cards, for example), etc. The hypervisor also manages conflicts, among other things, caused by operating system access to privileged machine instructions. The hypervisor can also be type 1 (native) or type 2 (hosted). According to various partitions, the operating systems, applications, application data, boot data, or other data, executable instructions, etc., of the machines are virtually stored on the resources of the hardware platform.

Figure 1B:
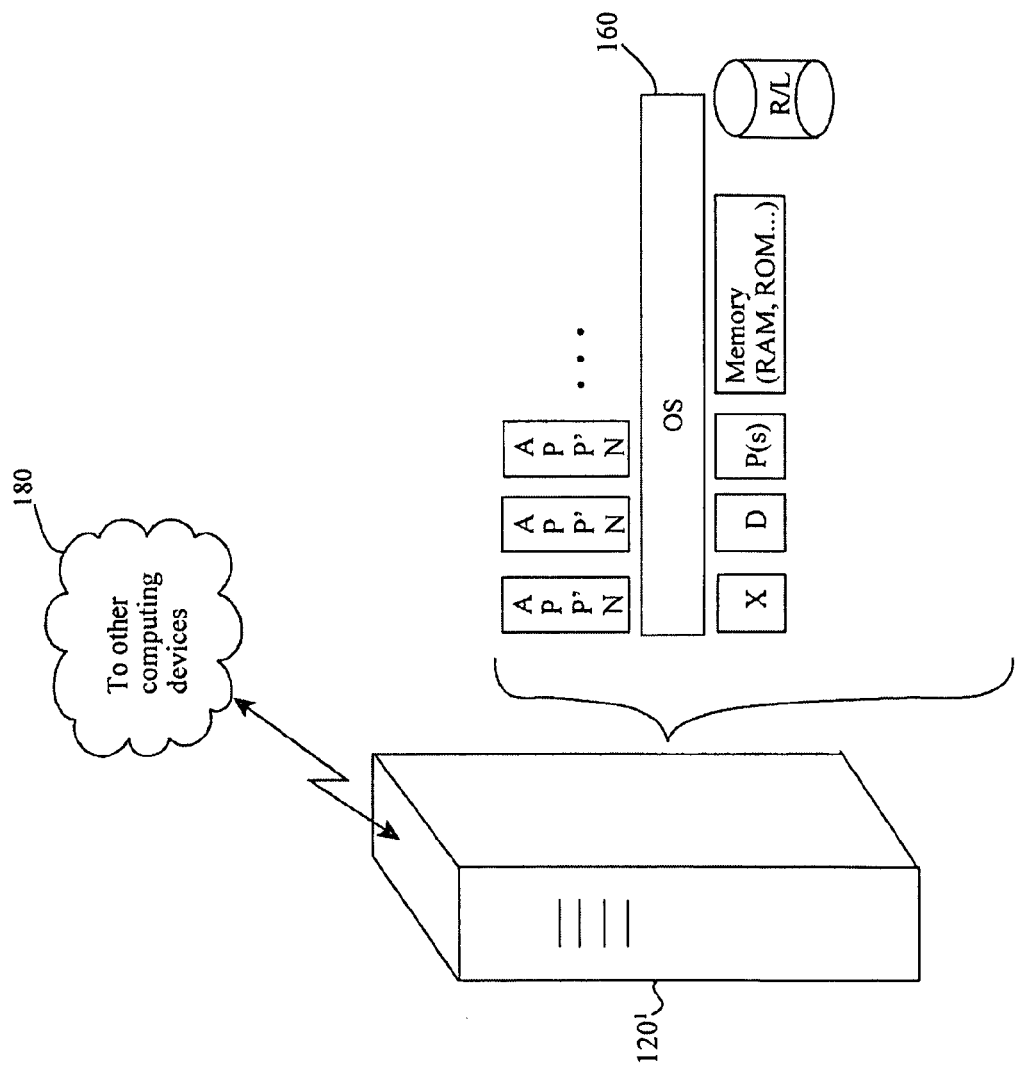

Alternatively, FIG. 1B shows a non-virtual environment in which a computing device 120', such as a server, includes a hardware platform of physical I/O, memory, access to remote or local storage drives (R/L), processor (P(s)), USB or other interfaces (X), drivers (D), etc., but with a single operating system 160 and one or more applications (app'n).

In either embodiment, the representative computing device 120, 120' can fulfill traditional or future-defined roles, such as web service, email service, database service, file service, etc. In network, they are arranged to communicate 180 with one or more other computing devices or networks. In this regard, the devices may use wired, wireless or combined connections to other devices/networks and may be direct or indirect connections. If direct, they typify connections within physical or network proximity (e.g., intranet). If indirect, they typify connections such as those found with the internet, satellites, radio transmissions, or the like. The connections may also be local area networks (LAN), wide area networks (WAN), metro area networks (MAN), etc., that are presented by way of example and not limitation. The topology is also any of a variety, such as ring, star, bridged, cascaded, meshed, or other known or hereinafter invented arrangement.

Figure 2:
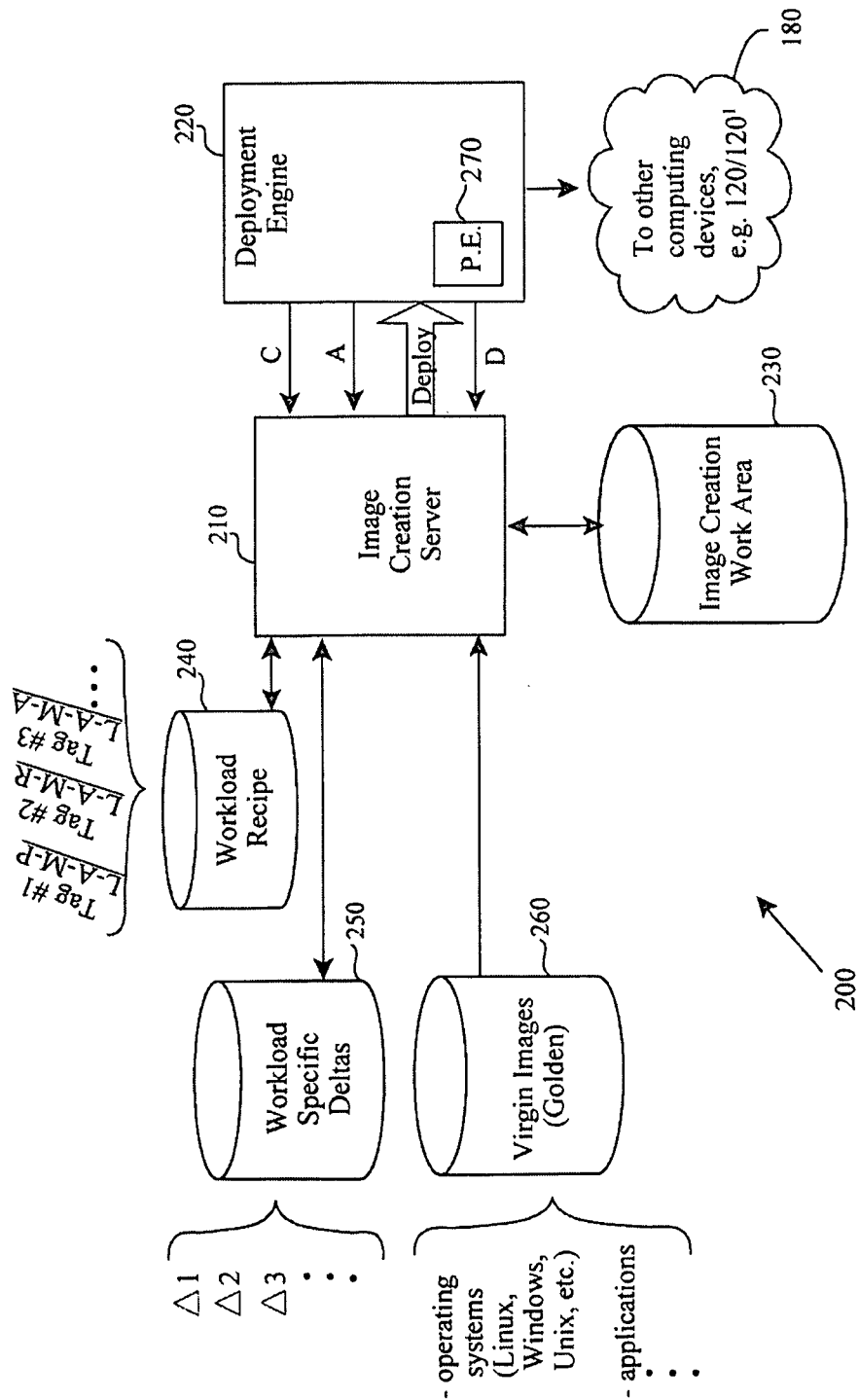
FIG. 2 is a diagrammatic view in accordance with the present invention for managing images for deployment to computing devices such as those of FIGS. 1A and 1B.

Leveraging the foregoing, FIG. 2 shows a high-level environment 200 for managing images for deployment to the computing devices of FIG. 1. Broadly, the environment includes an image creation server 210 and a deployment engine 220. In a variety of storage devices available to the image creation server, an image creation work area 230, workload recipes 240, workload deltas 250 and virgin or golden computing images 260 are defined. Similarly, a policy engine 270 together (as shown) or separate from the deployment engine is defined for use thereby. Altogether, images are managed in this context for storage and deployment.

In one instance, a delta of workload information is calculated for an operating workload of a computing device 120, 120' that is to be brought down. Upon a trigger event to later re-instantiate the operating workload, a workload image is configured for deployment back to the hardware platform including combining the delta with a software stack including an operating system and any applications for the computing device. The image creation server 210 configures the image and provides it to the deployment engine 220, who then deploys it to the computing device 120, 120', etc. The image creation server obtains the relevant delta $\Delta 1$, $\Delta 2$, $\Delta 3$, etc., from storage 250 and combines it with the software stacks in its image creation work area 230. The software stacks are saved as golden or virgin images in storage 260. At storage 240, a procedure or recipe is stored that the image creation server follows in order to put the software stack together.

For example, if the computing device 120, 120' includes a LAMP stack, each of the LAMP images, i.e., Linux, Apache, MySql, Perl/PHP/Python, are stored one each as virgin images on a disk and assembled only on an as-needed basis. At storage 240, the LAMP stack is uniquely identified as TAG #1, and a recipe is proscribed for the configuring the stack. In this instance, the recipe is as simple as the installation sequence: install and configure Linux; install and configure Apache Web Server; install and configure MySQL; and install and configure PHP. Of course, other tags are possible as indicated, and provide the image creation server with the necessary procedure for compiling an image when needed for a computing device. Ultimately, no longer are duplicitous servers need to individually retain their own version of the LAMP stack. Instead, only a single LAMP stack need be stored, not multiple such LAMP stacks. Also, the magnitude in storage of any deltas of workload information at 250 is trivial in comparison to bulk storage of duplicitous LAMP stacks. As skilled artisans can envision, dozens, hundreds or even thousands of LAMP stacks can be associated with computing devices and virtual machines deployed from a data center, especially in "cloud" computing environments. Now, however, only a single golden image of each L-A-M-P is required for storage. This minimizes the overhead costs associated with storage capacities and requirements for computing devices in comparison to the prior art.

Alternatively, during a first ever deployment of a workload image for a computing device, a policy defines both the images that are required in a given software stack and its order of assembly, e.g., recipe. Then, upon a first trigger event to instantiate the operating workload of the computing device, workload image is configured for deployment to the hardware platform including assembling the stack in the order of assembly.

The foregoing embodiments can also be configured in response to commands from the deployment engine. Namely, the image creation service supports the following operations:

Create (C) a specified workload image: Based on the workload specification, the corresponding image is created in the image creation work area. This operation creates a fresh image based on the software stack to be installed. The newly created workload image is exported (for instance via NFS) to the virtualization host where this workload will be hosted.

Assemble (A) a specified workload image: Based on the specified image handle, the corresponding workload image is put together as a file level overlay of the corresponding virgin images and the workload specific image delta. The image is constructed in the image creation work area and exported to the virtualization host where this workload will be hosted. The order in which the overlays are applied is based on the workload specific recipe that is created and saved when the workload image is created (C) for the first time.

Disassemble (D) a specified workload image: This disassembles the specified workload image as the image is no longer required. This operation is invoked if the particular workload instance is no longer executing. As part of this disassembly, the workload specific delta image is configured as the collection of all the files that have been modified (or created) since the workload image was put together and exported for execution. This delta image is stored under the workload handle and the storage allocated for the workload image in the image creation work area is freed up.

During use, a workload image for any one particular computing device is maintained as a sequence of file level overlays, such that:

workload1 image=virgin operating system (Linux) image+virgin Application image, if any+workload1 specific delta;

workload2 image=virgin operating system (Linux) image+virgin Application image, if any+workload2 specific delta; and so on for as many computing devices as required.

Figure 3:
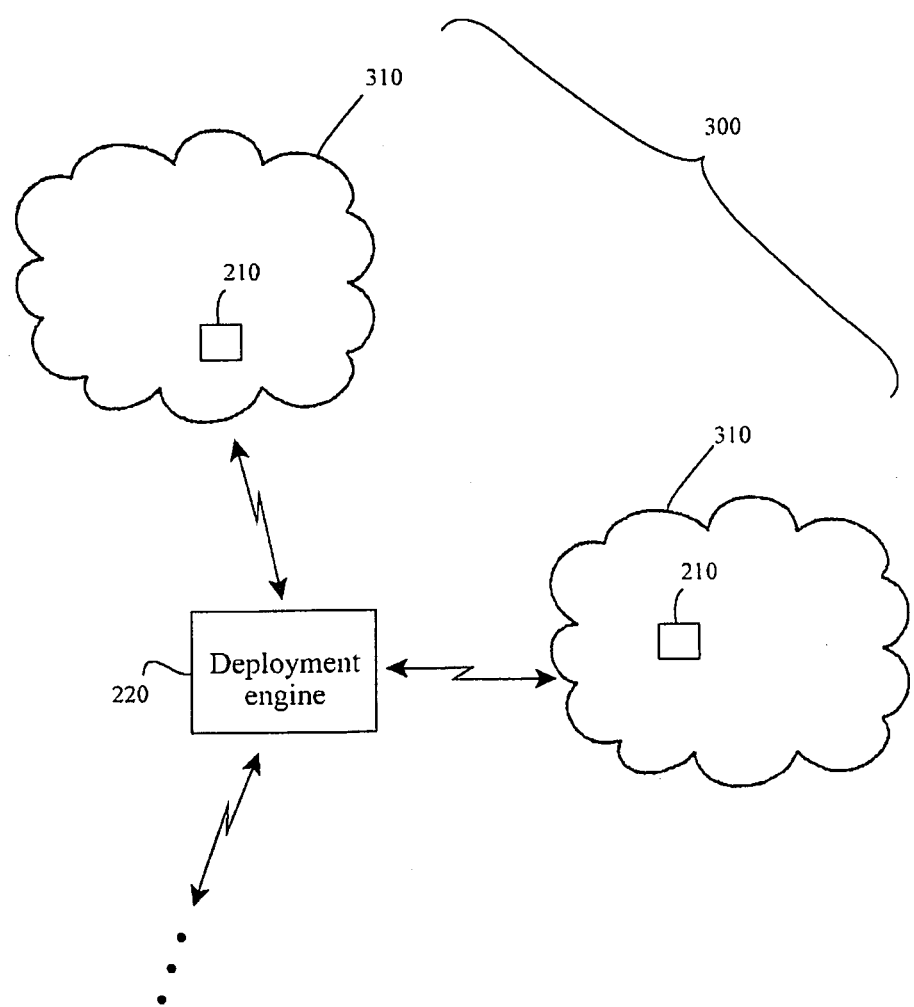
FIG. 3 is a diagrammatic view in accordance with the present invention of a data center environment managing images in accordance with FIG. 2.

With reference to FIG. 3, the features of FIG. 2 can be replicated many times over in a larger computing environment 300, such as a "cloud" environment or a large enterprise environment. For instance, multiple data centers 310 could exist that are each connected by way of a deployment engine 220. In turn, each data center could include an image creation server 210 and its attendant structures in order to mange, store and deploy images to individual computing devices 120, 120'. In turn, the policies of the engine could be scaled larger to account for competing interests between the individual data centers. Other policies could also exist that harmonize the events of the data centers. Alternatively still, a single image creation service could be used for the entirety of the data centers and/or each data center could have its own deployment engine. Nested hierarchies of all could further exist.

Appreciating that the use of the term software "stacks" could have different meanings to different programmers, the following is provided further add clarity. Namely, developers have been known to use the "M" of the LAMP stack to mean mod perl or mod python and the "P" to mean PostgreSQL, which essentially reverses the "M" and the "P" in functionality which would be accounted for by having various workload recipes. Alternatively, a LAMR stack (TAG #2, FIG. 2) is available and meant to indicate Ruby on Rails in place of PHP. In another, the "M" has been known to designate Middleware (including Ruby, Perl, Python etc.) while "P" is PostgreSQL. "M" can also be mSQL, which is an alternative open source database. The "L", on occasion, has been known to be replaced with an M (for Mac OS X), D (for Darwin OS), B (for BSD Unix variants), S (for Sun Solaris) or W (for Microsoft Windows). In the case of Microsoft Windows, the "A" can be replaced with an I (for IIS) to create the acronym WIMP. Still another stack is LAMA, (TAG #3, FIG. 2), which means: Linux Apache Mono Asp.net. In still other stacks, unified application developments are contemplated for Apple Inc.'s WebObjects, Java/Java EE, Grails, and Microsoft's NET architecture, to name a few.

In still other embodiments, skilled artisans will appreciate that enterprises can implement some or all of the foregoing with humans, such as system administrators, computing devices, executable code, or combinations thereof. In turn, methods and apparatus of the invention further contemplate computer executable instructions e.g., code or software, as part of computer program products on readable media, e.g., disks for insertion in a drive of computing device, or available as downloads or direct use from an upstream computing device. When described in the context of such computer program products, it is denoted that items thereof, such as modules, routines, programs, objects, components, data structures, etc., perform particular tasks or implement particular abstract data types within various structures of the computing system which cause a certain function or group of function, and such are well known in the art.

Lastly, although the foregoing has been described in terms of specific embodiments, one of ordinary skill in the art will recognize that additional embodiments are possible without departing from the teachings of the present invention. This detailed description, therefore, and particularly the specific details of the exemplary embodiments disclosed, is given primarily for clarity of understanding, and no unnecessary limitations are to be implied, for modifications will become evident to those skilled in the art upon reading this disclosure and may be made without departing from the spirit or scope of the invention. Relatively apparent modifications, of course, include combining the various features of one or more figures with the features of one or more of other figures.

The invention claimed is:

1. In a computing system environment, a method of managing images for a computing device having a hardware platform, comprising:
    calculating a delta of workload information when an operating workload for the computing device is to be brought down;
    upon a trigger event to later re-instantiate the operating workload of the computing device, configuring a workload image for deployment back to the hardware platform including combining the delta with a software stack including an operating system and any applications for the computing device;
    assembling the software stack according to a predetermined policy defining what images are required in a given software stack of many possible software stacks according to intended workloads of various computing devices during use; and
    storing on a storage device a procedure that strictly executes an order of assembly during the assembling the software stack.

2. The method of claim 1, further including assembling the software stack from stored virgin images of the operating system and said any applications.

3. The method of claim 1, further including establishing a computing policy defining under what circumstances the operating workload of the computing device is to be said brought down.

4. In a computing system environment, a method of managing images for a computing device having a hardware platform, comprising:
    establishing a computing policy defining what images are required in a given software stack of many possible software stacks according to intended workloads of computing devices during use;
    establishing an order of assembly for each said given software stack of the many possible software stacks;
    upon a trigger event to instantiate an operating workload of the computing device, configuring a workload image for deployment to the hardware platform, the configuring including assembling in the order of assembly the given software stack from stored virgin images of an operating system and any applications for the computing device;
    calculating a delta of workload information when the operating workload for the computing device is to be brought down,
    wherein upon a trigger event to later re-instantiate the operating workload of the computing device, further configuring an updated workload image for deployment to the hardware platform including combining the delta with the software stack.

5. The method of claim 4, further including establishing a computing policy defining under what circumstances the operating workload of the computing device is to be said brought down.

6. In a computing system environment, a method of managing images for just-in-time deployment to a hardware platform of a computing device, comprising:
    establishing an order of assembly for each of a plurality of software stacks according to intended workloads of computing devices during use;
    establishing a computing policy defining under what circumstances an operating workload of the computing device is to be brought down;
    upon a first trigger event to instantiate the operating workload of the computing device, configuring a workload image for deployment to the hardware platform, the configuring including assembling in the order of assembly at least one of the software stacks from stored virgin images of an operating system and any applications for the computing device;
    tagging each of the plurality of software stacks with a unique identifier;
    upon a second trigger event to said bring down the operating workload of the computing device, calculating a delta of workload information; and
    upon a third trigger event to later re-instantiate the operating workload of the computing device, configuring another workload image for deployment to the hardware platform including assembling again in the order of assembly the at least one of the software stacks for combination with the delta of workload information.

7. The method of claim 6, further including examining the unique identifier of the at least one of the software stacks during re-instantiation to ensure consistent stack deployment.

8. The method of claim 6, wherein the configuring the another workload image for said deployment to the hardware platform occurs by examining the unique identifier and the established order of assembly therefor.

* * * * *